US012090596B2

(12) United States Patent
Sannomiya et al.

(10) Patent No.: US 12,090,596 B2
(45) Date of Patent: Sep. 17, 2024

(54) CONTROL DEVICE FOR MACHINE TOOL AND MACHINE TOOL

(71) Applicants: CITIZEN WATCH CO., LTD., Tokyo (JP); CITIZEN MACHINERY CO., LTD., Nagano (JP)

(72) Inventors: Kazuhiko Sannomiya, Kitasaku-gun (JP); Takaichi Nakaya, Kitasaku-gun (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 636 days.

(21) Appl. No.: 17/291,414

(22) PCT Filed: Dec. 27, 2019

(86) PCT No.: PCT/JP2019/051601
§ 371 (c)(1),
(2) Date: May 5, 2021

(87) PCT Pub. No.: WO2020/145213
PCT Pub. Date: Jul. 16, 2020

(65) Prior Publication Data
US 2021/0370455 A1    Dec. 2, 2021

(30) Foreign Application Priority Data
Jan. 10, 2019    (JP) .................................. 2019-002685

(51) Int. Cl.
*B23B 25/02*    (2006.01)
*B23Q 5/58*    (2006.01)

(52) U.S. Cl.
CPC .................................... *B23Q 5/58* (2013.01)

(58) Field of Classification Search
CPC .......... B23B 29/125; B23Q 5/22; B23Q 5/28; B23Q 5/32; B23Q 15/0075; B23Q 15/013; B23Q 2230/004; B23Q 2727/00
See application file for complete search history.

(56) References Cited

U.S. PATENT DOCUMENTS 5,101,599 A * 4/1992 Takabayasi ........... B06B 1/0261
                                                  451/910
5,911,802 A * 6/1999 Kimura ................... B23B 25/02
                                                  82/904
(Continued)

FOREIGN PATENT DOCUMENTS

EP    3 124 174 A1    2/2017
EP    3 187 290 A1    7/2017
(Continued)

OTHER PUBLICATIONS

International Search Report issued in PCT/JP2019/051601 (PCT/ISA/210), dated Mar. 3, 2020.

*Primary Examiner* — Nicole N Ramos
(74) *Attorney, Agent, or Firm* — Birch, Stewart, Kolasch & Birch, LLP

(57) ABSTRACT

A control device for a machine tool comprises a control section controlling the relative rotation and feeding of a cutting tool and a material, performing cutting with vibration of the cutting tool relative to the material by combining a forward feed movement in the machining direction, and a return movement in the counter-machining direction. A return movement setting section sets a pulse-like signal including a command for moving a cutting tool in the machining direction and a command for the return movement. A forward feed setting section makes the cutting tool reach a change point by combining the movement in the machining direction on the basis of the return movement setting section and the forward feed movement. A pulse-like (Continued)

signal is formed in sine waveform with an inflection point, and a phase of the inflection point is set to a value different from a phase of the change point.

6 Claims, 14 Drawing Sheets

(56) References Cited

U.S. PATENT DOCUMENTS

| | | | |
|---|---|---|---|
| 7,861,624 B2 * | 1/2011 | Kunimatsu | B23B 29/125 |
| | | | 82/1.11 |
| 10,610,993 B2 * | 4/2020 | Nakaya | G05B 19/4093 |
| 10,744,567 B2 * | 8/2020 | Sannomiya | B23Q 15/013 |
| 10,744,611 B2 * | 8/2020 | Nakaya | G05B 19/416 |
| 11,253,924 B2 * | 2/2022 | Kitakaze | B23B 29/125 |
| 11,338,404 B2 * | 5/2022 | Sannomiya | B23Q 15/013 |
| 2009/0107308 A1 | 4/2009 | Woody et al. | |
| 2014/0102268 A1 * | 4/2014 | Hariki | B23Q 5/28 |
| | | | 82/117 |
| 2016/0266567 A1 * | 9/2016 | Watanabe | G05B 19/19 |
| 2017/0108846 A1 | 4/2017 | Sannomiya et al. | |
| 2017/0246718 A1 | 8/2017 | Sannomiya et al. | |
| 2019/0388977 A1 * | 12/2019 | Mugrage | B23B 1/00 |
| 2020/0156200 A1 | 5/2020 | Nakaya et al. | |

FOREIGN PATENT DOCUMENTS

| | | |
|---|---|---|
| JP | 48-52083 A | 7/1973 |
| JP | 53-69758 A | 6/1978 |
| JP | 2006-312223 A | 11/2006 |
| WO | WO 2015/146945 A1 | 10/2015 |
| WO | WO 2016/031897 A1 | 3/2016 |
| WO | WO 2019/026768 A1 | 2/2019 |

* cited by examiner

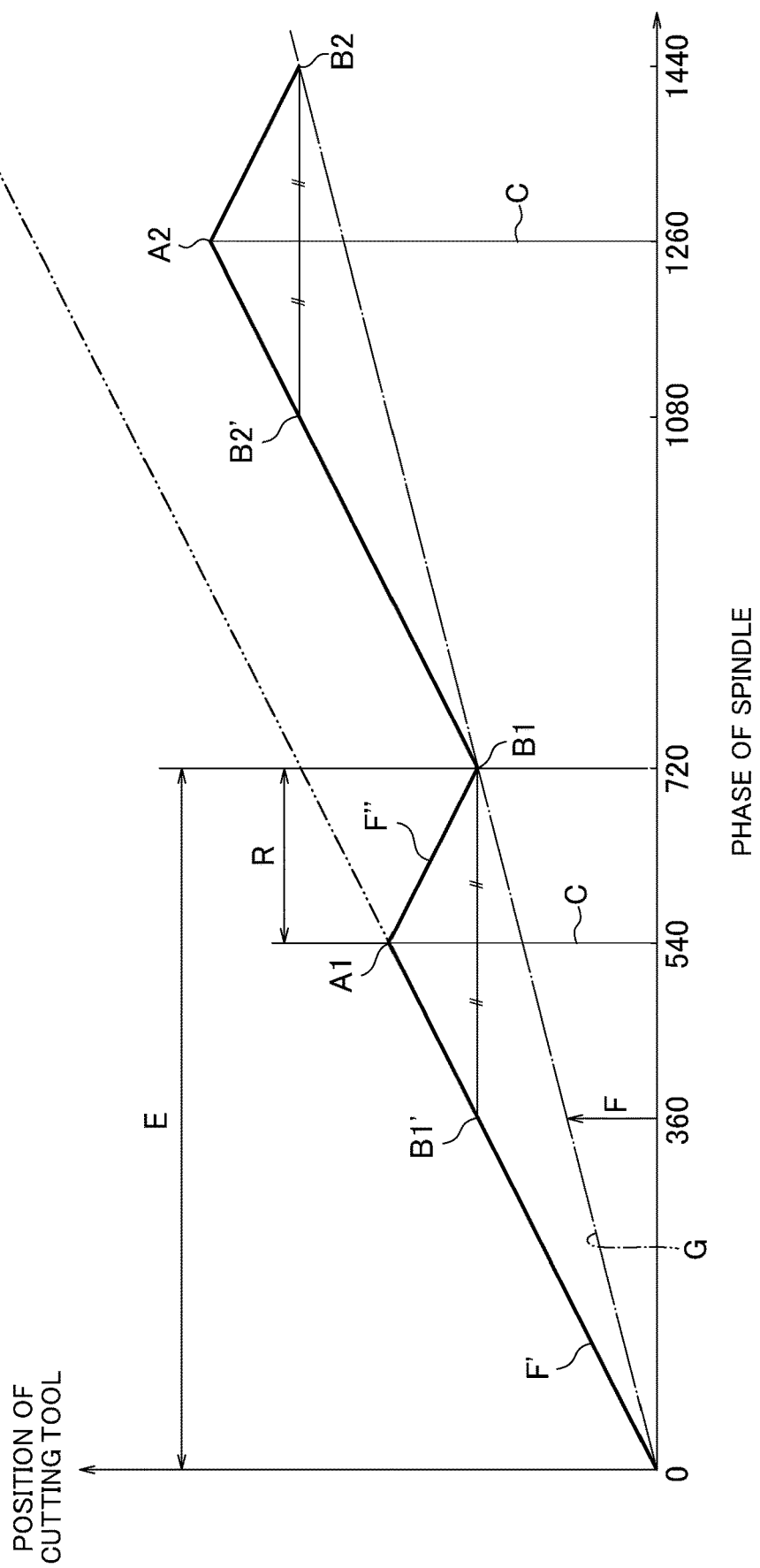

CONTROL DEVICE FOR MACHINE TOOL AND MACHINE TOOL

TECHNICAL FIELD

The present invention relates to a control device for a machine tool and a machine tool.

BACKGROUND ART

For example, Patent Literature 1 discloses a technique in vibration cutting that includes a feeding means for feeding a relatively rotating cutting tool and material, and the cutting tool is reciprocated relative to the material and chips can be segmented in cutting the material by combining a forward feed movement in the machining direction, in which the cutting tool machines the material, and a return movement in the counter-machining direction different from the machining direction.

CITATION LIST

Patent Literature

[Patent Literature 1] Japanese Patent Application Laid-Open No. 48-52083

SUMMARY OF INVENTION

Technical Problem

In the vibration cutting described in Patent Literature 1, when the cutting tool returns in the counter-machining direction in the reciprocal movement, there is a problem that it is not easy to perform the vibration cutting with considering the return movement of the cutting tool to a predetermined position, which corresponds to a predetermined amount of feed of the cutting tool.

The present invention has been made in view of the above-described problem, and an object of the present invention is to provide a control device for a machine tool and a machine tool capable of easily performing cutting with vibration according to the amount of feed.

Solution to Problem

Firstly, the present invention is characterized in that a control device for a machine tool comprises: a feeding means for feeding a relatively rotating cutting tool and material; and a control means for controlling the rotation and operation of the feeding means, the control means performing control such that cutting is performed with vibrating the cutting tool relative to the material by combining a forward feed movement in the machining direction, in which the cutting tool machines the material, and a return movement in the counter-machining direction different from the machining direction, wherein the control device includes: a return position calculation means for calculating a return position of the cutting tool at time when one vibration is completed on the basis of the number of vibrations and an amount of feed that are predetermined for one rotation of the cutting tool or the material; a forward feed setting means for setting the forward feed movement on the basis of a change point setting value that determines a change point from the machining direction to the counter-machining direction; and for making the cutting tool reach the determined change point, and a return movement setting means for setting a pulse-like signal that is output as a command for the return movement so that the cutting tool reaches the calculated return position at time when one vibration is completed, and wherein the return movement setting means sets a pulse-like signal including a command for moving a cutting tool in the machining direction and a command for the return movement, and the forward feed setting means makes the cutting tool reach the change point by combining the movement in the machining direction on the basis of the return movement setting means and the forward feed movement, the pulse-like signal is formed in sine waveform with an inflection point, and a phase of the inflection point for making the cutting tool reach the change point is set to a value different from a phase of the change point.

Secondly, it is characterized in that the number of vibrations is one or more.

Thirdly, it is characterized in that the number of vibrations is less than one.

Fourthly, it is characterized in that a machine tool comprises any one of the above-described control devices for a machine tool.

Advantageous Effects of Invention

The present invention can provide the following effects.
(1) the cutting tool can be fed with the vibration by combining the forward feed movement and the return movement. In particular, by the return position calculation means, the forward feed setting means and the return movement setting means, the vibration of the cutting tool can be automatically set according to the predetermined amount of feed. Thus, it is possible to easily perform cutting with the vibration according to the amount of feed. The pulse-liked signal can be formed in sine waveform as a command for both of the movement in the machining direction and the return movement.

Further, if the phase of the inflection point in the pulse-liked signal is set to the same value as the phase of the change point, in the root of the cutting tool, the position of the change point, at which the movement direction of the cutting tool is switched from the machining direction to the counter-machining direction, may be displaced. However, by setting the phase of the inflection point in the sine waveform to a value different from the phase of the change point corresponding to this inflection point, the cutting tool can reach the change point at a predetermined phase, and the root of the cutting tool, in which the machining direction is switched at the change point in a sine curve, can be obtained.
(2) Vibration cutting in which the cutting tool or the material vibrates once or more during one rotation of the material or the cutting tool can be performed.
(3) Vibration cutting in which the material or the cutting tool rotates once or more during one vibration of the cutting tool or the material can be performed.
(4) A machine tool capable of easily performing cutting with the vibration according to the amount of feed can be provided.

BRIEF DESCRIPTION OF DRAWINGS

FIG. 8 is a diagram illustrating the vibration waveform of the reference example 2.

DESCRIPTION OF EMBODIMENTS

Figure 1:
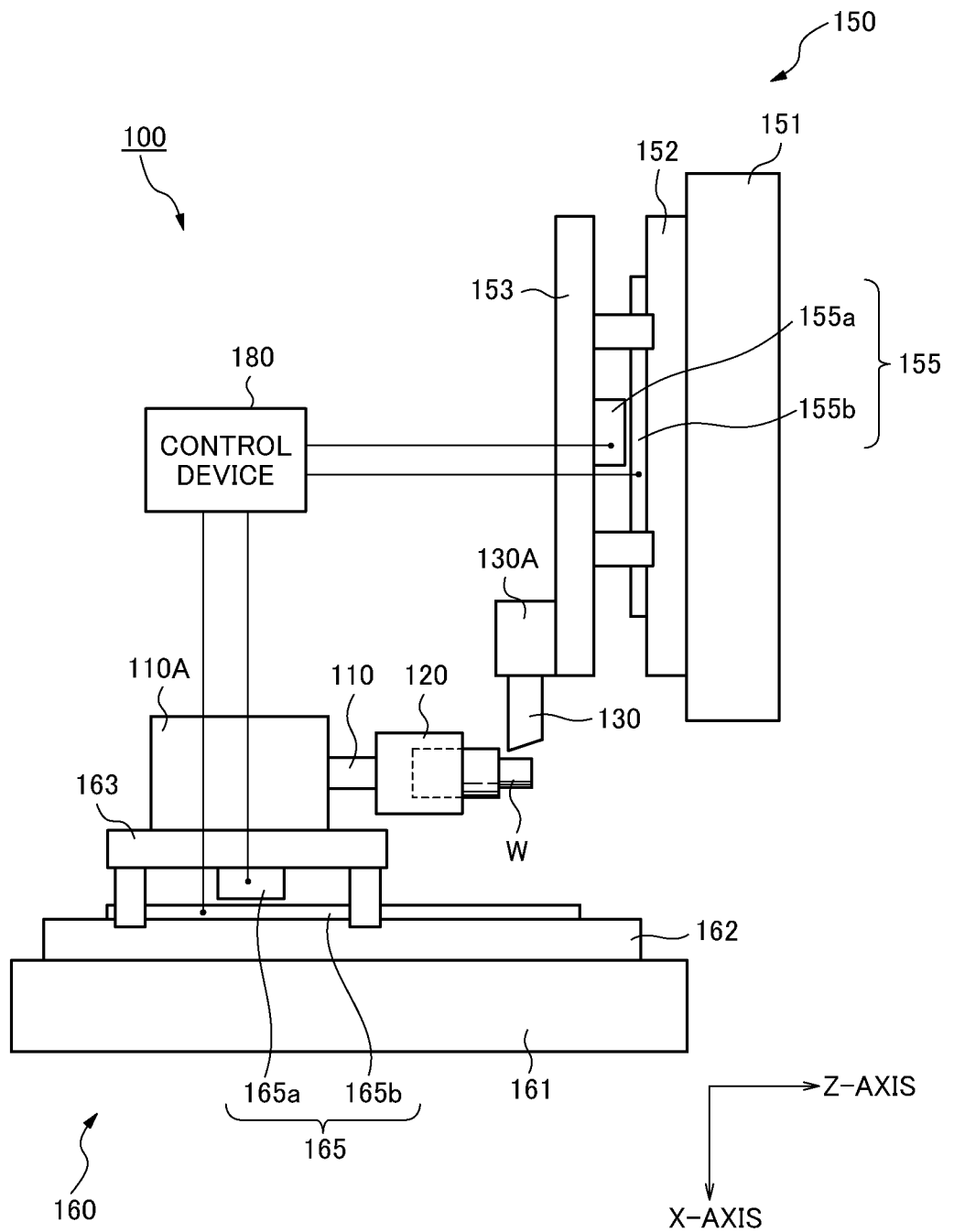
FIG. 1 is a schematic diagram of a machine tool according to an example of the present invention.

Hereinafter, a control device for a machine tool and a machine tool according to the present invention will be described with reference to the drawings. As shown in FIG. 1, a machine tool 100 includes a spindle 110, a cutting tool 130 such as a tool bit for machining a workpiece W, and a control device 180.

A chuck 120 is provided at the end of the spindle 110, and the workpiece W is held by the spindle 110 via the chuck 120. The spindle 110 is rotatably supported by a spindle headstock 110A and rotationally driven by the power of a spindle motor (for example, a built-in motor) provided between the spindle headstock 110A and the spindle 110, for example. The spindle headstock 110A is installed on a Z-axis direction feeding mechanism 160.

The Z-axis direction feeding mechanism 160 includes a base 161 integral with a bed, and a Z-axis direction guide rail 162 slidably supporting a Z-axis direction feeding table 163. When the Z-axis direction feeding table 163 is moved by the drive of a linear servomotor 165 along the Z-axis direction shown in the figure which coincides with the rotational axis direction of the workpiece W, the spindle headstock 110A moves in the Z-axis direction. The linear servomotor 165 has a mover 165a and a stator 165b. The mover 165a is provided on the Z-axis direction feeding table 163, and the stator 165b is provided on the base 161.

The cutting tool 130 is mounted on a tool post 130A, and the tool post 130A is installed on an X-axis direction feeding mechanism 150.

The X-axis direction feeding mechanism 150 includes a base 151 integral with a bed, and an X-axis direction guide rail 152 slidably supporting an X-axis direction feeding table 153. When the X-axis direction feeding table 153 moves along the X-axis direction orthogonal to the Z-axis direction shown in the figure by the drive of a linear servomotor 155, the tool post 130A moves in the X-axis direction. The linear servomotor 155 has a mover 155a and a stator 155b. The mover 155a is provided on the X-axis direction feeding table 153, and the stator 155b is provided on the base 151.

A Y-axis direction feeding mechanism may be provided in the machine tool 100. The Y-axis direction is a direction orthogonal to the Z-axis direction and the X-axis direction shown in the figure. The Y-axis direction feeding mechanism may have the same structure as the Z-axis direction feeding mechanism 160 or the X-axis direction feeding mechanism 150. As is conventionally known, the cutting tool 130 can be moved in the Y-axis direction in addition to the X-axis direction by a combination of the X-axis direction feeding mechanism 150 and the Y-axis direction feeding mechanism.

Although the Z-axis direction feeding mechanism 160, the X-axis direction feeding mechanism 150 and the Y-axis direction feeding mechanism have been described with an example using a linear servomotor, a known ball screw and servomotor may be used.

The rotation of the spindle 110, the movement of the Z-axis direction feeding mechanism 160 and the like are controlled by the control device 180.

Figure 2:
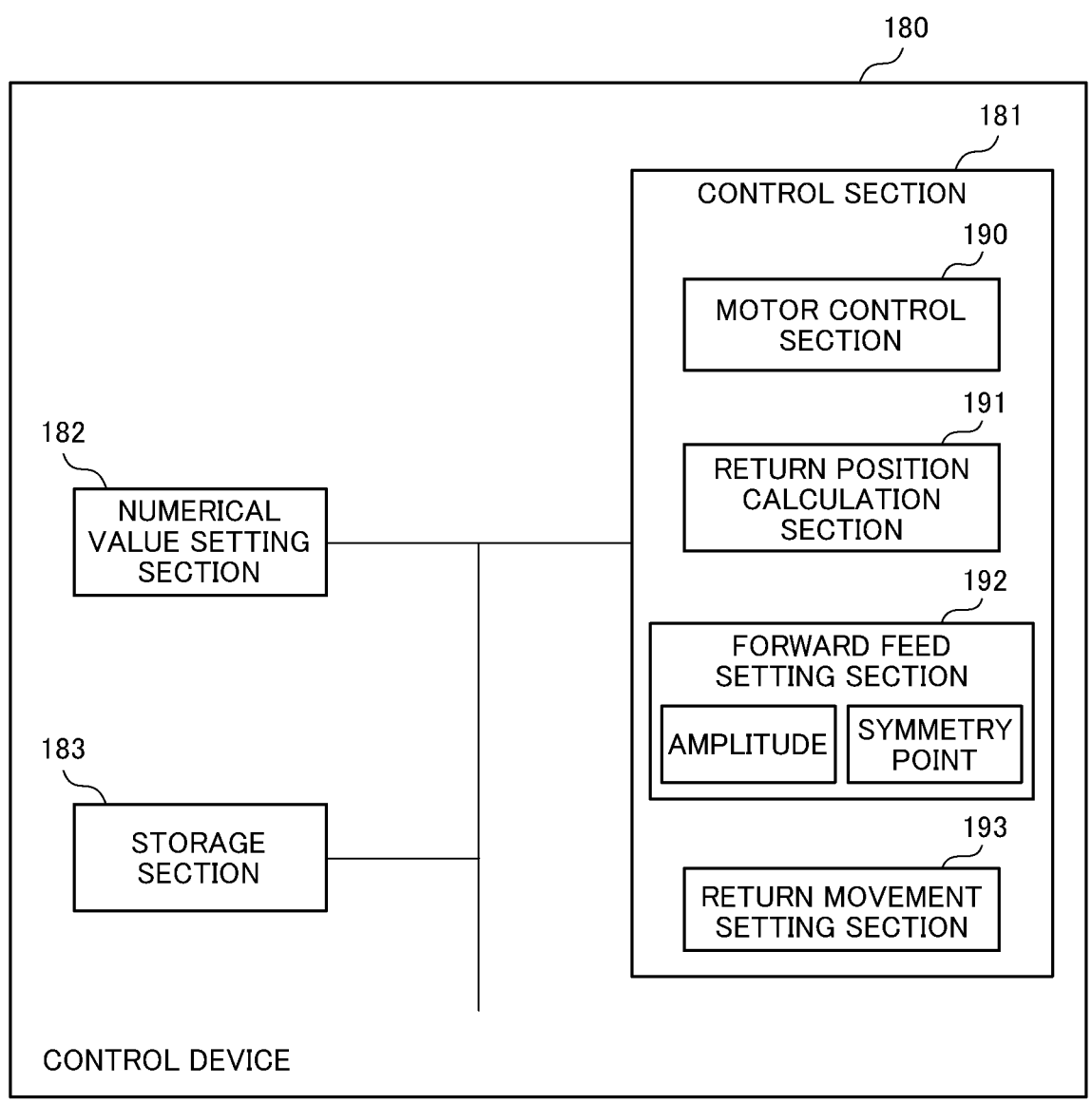
FIG. 2 is a block diagram of a control device.

As shown in FIG. 2, the control device 180 includes a control section 181, a numerical value setting section 182, and a storage section 183, which are connected via a bus.

The control section 181 is composed of a CPU or the like, loads various programs and data which are stored in, for example, a ROM of the storage section 183 into a RAM, and executes the program. Thereby, the operation of the machine tool 100 can be controlled on the basis of the program.

The control section 181 has a motor control section 190 that is capable of controlling the rotation of the spindle 110 and the feed of the Z-axis direction feeding mechanism 160 and controls the operation of each motor.

In the example in FIG. 1, the control device 180 drives the spindle motor to rotate the workpiece W relative to the cutting tool 130, drives the Z-axis direction feeding mechanism 160 to move the workpiece W relative to the cutting tool 130 in the Z-axis direction, and drives the X-axis direction feeding mechanism 150 to move the cutting tool 130 relative to the workpiece W in the X-axis direction. The cutting tool 130 is moved relative to the workpiece W with a relative movement between the cutting tool 130 and the workpiece W, and the cutting tool 130 is fed relative to the workpiece W in a predetermined feed direction so that the workpiece W can be machined by the cutting tool 130.

Figure 3:
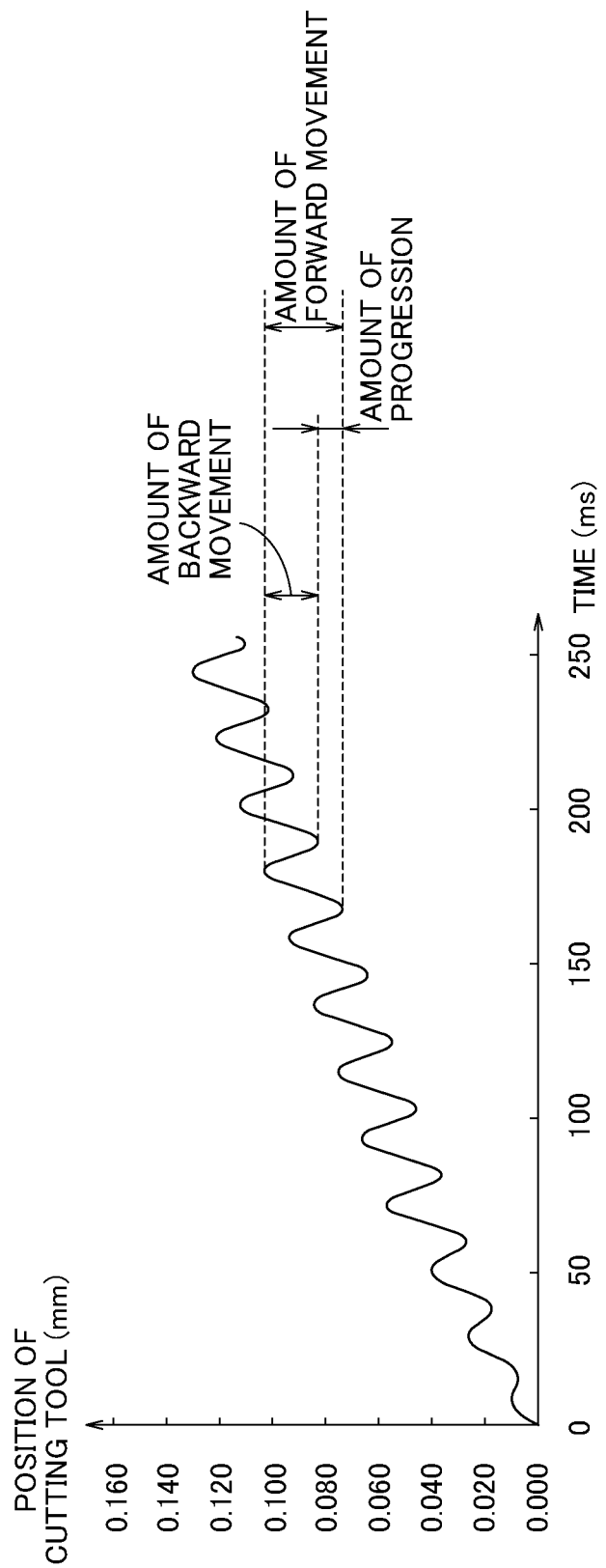
FIG. 3 is a diagram illustrating the reciprocal movement and the position of a cutting tool.

As shown in FIG. 3, the control device 180 moves the cutting tool 130 relative to the workpiece W along the feed direction by a predetermined amount of the forward movement toward the machining direction, which is the advancing direction of the machining feed, (this movement is referred to as forward movement), and then the Z-axis direction feeding mechanism 160 or the X-axis direction feeding mechanism 150 is driven to move the cutting tool

130 by a predetermined amount of backward movement toward the counter-machining direction, which is the opposite direction to the machining direction (this movement is referred to as backward movement). The control section 181 moves the Z-axis direction feeding mechanism 160 or the X-axis direction feeding mechanism 150 to move the spindle headstock 110A or the tool post 130A so that the cutting tool 130 reciprocates and vibrates relative to the workpiece W. Then, the cutting tool 130 can be fed relative to the workpiece W by a difference (an amount of progression) between the amount of the forward movement and the amount of the backward movement. When the outer periphery of the workpiece W is cut by the cutting tool 130, the circumferential surface of the workpiece W is machined in a waveform according to the phase of the spindle 110.

Figure 4:
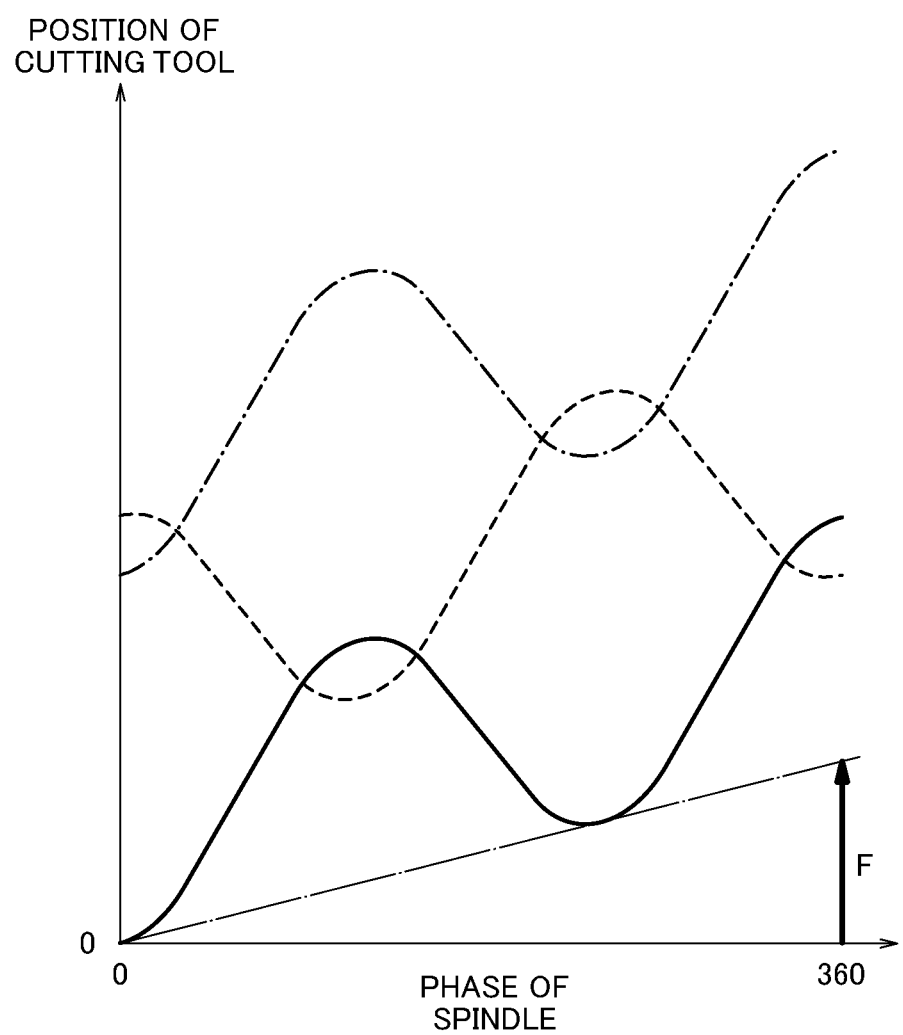
FIG. 4 is a diagram illustrating the routes of the cutting edge of the nth rotation, the n+1th rotation and the n+2th rotation of a spindle.

The total amount of progressing movement while the phase of the spindle changes from 0 degree to 360 degrees, which is one rotation of the workpiece W, is the amount of feed F of the cutting tool. The number of reciprocal movements of the cutting tool 130 in one rotation of the workpiece W is the number of vibration D. FIG. 4 shows an example in which the number of vibrations D is 1.5 (times/r). A virtual line (dashed line) passing through the valley of the waveform is a feed straight line indicating the amount of feed, and a position where the phase of the spindle is 360 degrees in the feed straight line corresponds to the amount of feed F per one rotation of the workpiece W.

Since the number of vibrations D is not an integer, the route of the cutting edge of the cutting tool 130 in the nth rotation of the spindle 110 (or workpiece W) (indicated by a solid line in FIG. 4) and the route of the cutting edge in the n+1th rotation (indicated by a broken line in FIG. 4) shift in the direction of the phase of the spindle (horizontal axis direction of the graph in FIG. 4), and the routes of the cutting edge of the cutting tool 130 overlaps while cutting the workpiece W.

In the overlap period of the routes of the cutting edge in which the route of the cutting edge of the n+1th rotation is included in the route of the cutting edge of the nth rotation, portions to be machined in the workpiece W has already been machined by the machining of the nth rotation. Therefore, the cutting tool 130 and the workpiece W do not contact in the feed direction. Thus, there is an air-cut period in which the cutting tool 130 substantially does not machine the workpiece W, and chips generated on the workpiece W are divided into segmented chips. The cutting tool 130 machines the workpiece W while vibrating by being reciprocated relative to the workpiece W. This vibration cutting makes it possible to machine the workpiece W smoothly with segmenting chips.

In the example in FIG. 4, the nth route of the cutting edge and the n+1th route of the cutting edge are reversed by 180 degrees. The air-cut period can be obtained if the nth route of the cutting edge and the n+1 route of the cutting edge do not coincide with each other (are not in the same phase), and it is only necessary that the nth route of the cutting edge and the n+1th route of the cutting edge shift in the phase direction of the spindle.

However, if the amount of feed F is increased while maintaining the constant amplitude, the period in which the route of the cutting edge of the n+1th rotation is included in the route of the cutting edge of the nth rotation decreases. If the route of the cutting edge of the n+1th rotation does not reach the route of the cutting edge of the nth rotation, the air-cut period will not be obtained.

The period in which the route of the cutting edge of the n+1th rotation is included in the route of the cutting edge of the nth rotation changes in accordance with the amount of feed F and the amplitude of the vibration waveform. Therefore, the control section 181 is configured to set the amplitude of the vibration waveform in proportion with the amount of feed F so that the air-cut period is obtained. For performing the cutting, the number of rotations of the spindle and the amount of feed F are specified in advance for example by specifying them in a machining program. An amplitude ratio with respect to the amount of feed F is defined as an amplitude feed ratio Q. The control section 181 is configured to set the amplitude to Q*F, which is a multiplication of the amount of feed F and the amplitude feed ratio Q. The amplitude feed ratio Q can be specified as a value following Q (argument Q), for example, in a machining program. Similarly, the number of vibrations D can also be specified as a value following D (argument D) in the machining program.

The control section 181 has a return position calculation section 191, a forward feed setting section 192 and a return movement setting section 193 in order to move the cutting tool 130 relative to the workpiece W with vibrating the cutting tool 130. The control section 181 corresponds to the control means of the present invention, and the return position calculation section 191, the forward feed setting section 192, and the return movement setting section 193 correspond to the return position calculation means, the forward feed setting means and the return movement setting means of the present invention respectively.

Figure 5:
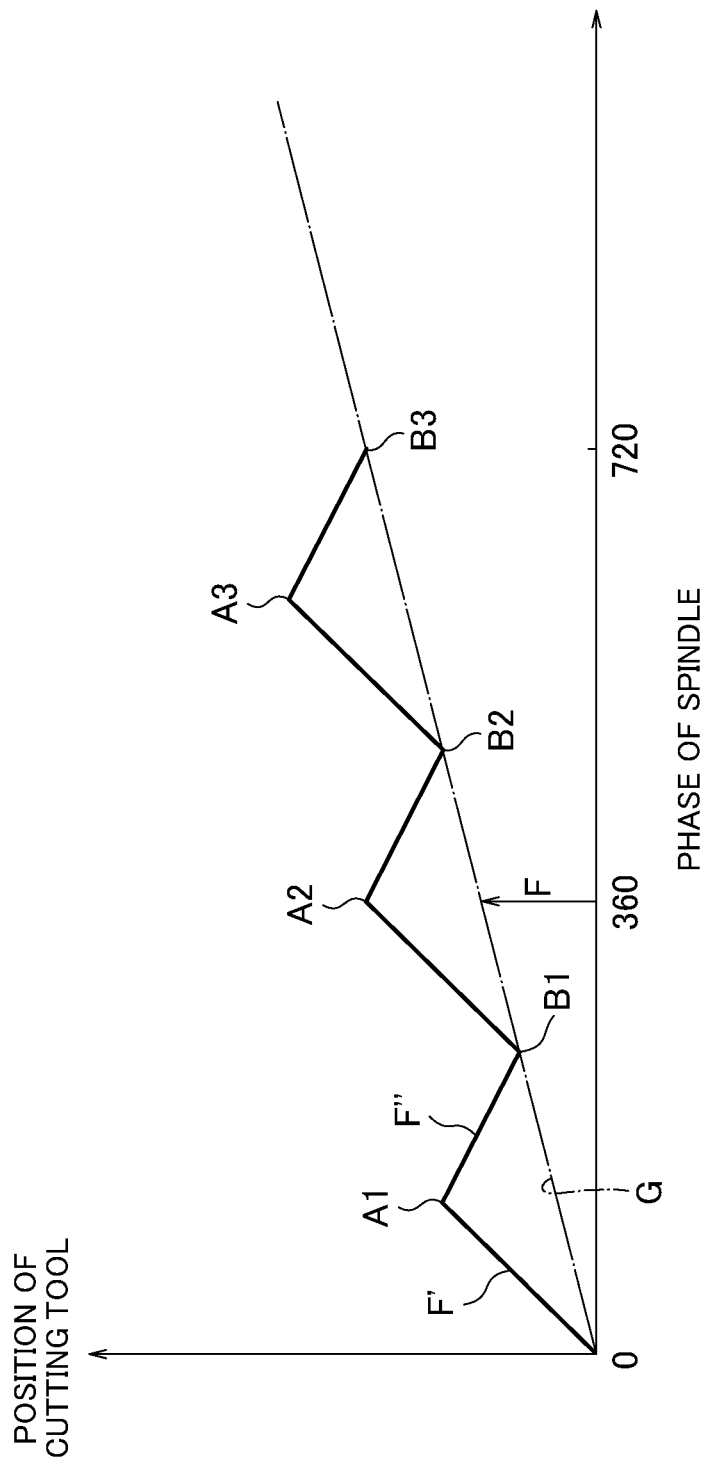
FIG. 5 is a diagram illustrating the vibration waveform of the reference example 1.

When the amount of feed F is specified, a feed straight line is determined as shown in FIG. 5. Hereinafter, the feed straight line is referred to as a substantial feed line G. In a case where the number of vibrations D is 1.5 (times/r), the substantial feed lined G is indicated by a dashed line in the graph in FIG. 5. In the graph, the phase of the spindle 110 is set as the horizontal axis direction and the position of the cutting tool 130 in the feed direction is set as the vertical axis. The cutting tool 130 is fed relative to the workpiece W so that the cutting tool 130 reaches the substantial feed line G at the time when one vibration is completed, the movement thereof switches from the backward movement to the forward movement, and the cutting tool 130 vibrates 1.5 times during one rotation of the workpiece W, in other words vibrates 3 times during two rotation of the workpiece W.

On the basis of the number of vibrations D and the amount of feed F, the return position calculation section 191 calculates a position on the substantial feed line G, at which the cutting tool 130 is located at the time when one vibration is completed, as a return position.

Figure 6A:
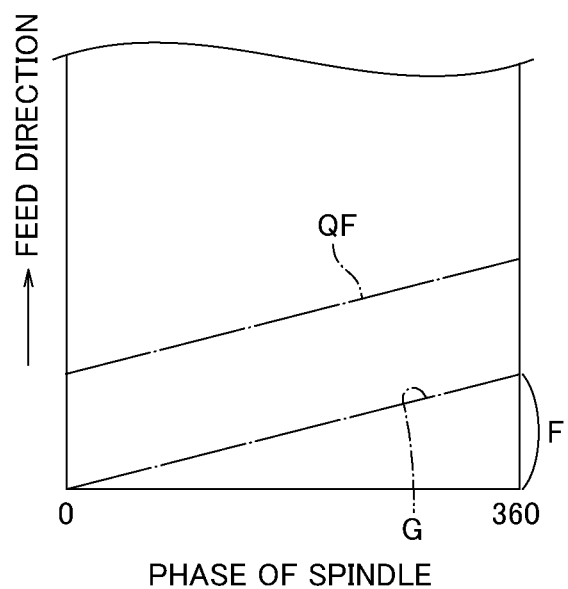
FIG. 6A is a diagram illustrating the generation of the vibration waveform of the reference example 1.
Figure 6B:
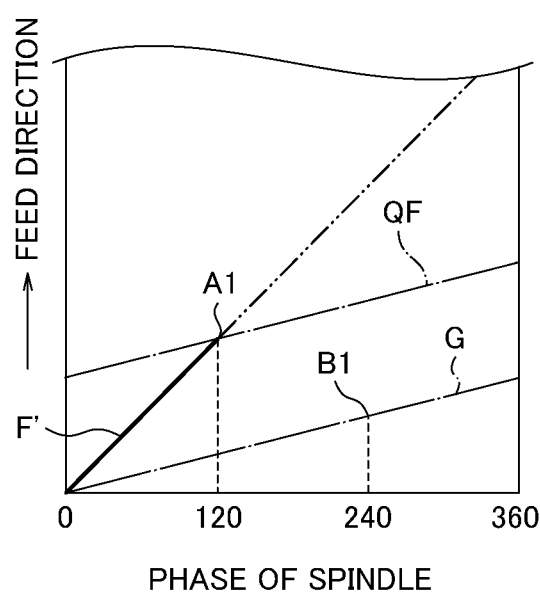
FIG. 6B is a diagram illustrating the generation of the vibration waveform of the reference example 1.

FIG. 5 shows return positions for three vibrations as direction change points B1, B2 and B3 where the movement switches from the backward movement to the forward movement. The vibration waveform in FIG. 5 is expressed on a workpiece basis, and return positions of the cutting tool 130 at the time when one vibration is completed are on a substantial feed line G indicated by a dashed line in FIG. 6A. The phase of the spindle at the return position of the cutting tool 130 is obtained by multiplying the angle of one rotation of the workpiece W (360 degrees) by the inverse number (⅔) of the number of vibrations D. As shown in FIG. 6B, in the reference example 1, the change point B1 is at a position where the phase of the spindle is 240 degrees. Thereafter, the position of each change point is on the substantial feed line G, and intervals between change points are determined by multiplying the angle of one rotation of the workpiece W by the inverse number of the number of vibrations D. In the reference example 1, the change point B2 on the substantial feed line G is at a position where the phase of the spindle is 480 degrees, and the change point B3 is at a position where the phase of the spindle is 720 degrees. The return position calculation section 191 can calculate each return position on the basis of the amount of feed F and the number of vibrations D as described above.

On the other hand, the amplitude is set by multiplying the amount of feed F by the amplitude feed ratio Q. Therefore, the direction change point A1, at which the forward movement switches to the backward movement, is on a straight line (amplitude line QF) that is obtained by offsetting the actual feed line G by the amplitude Q*F. In the case of the reference example 1, the phase of the spindle at the change point A1 is 120 degrees, which is a phase of the spindle obtained by multiplying 240 degrees, which is the phase of the spindle at the change point B1, by the inverse number (½) of the numerator of the inverse number (⅔) of the number of vibrations D. As shown in FIG. 6B, the change point A1 is set from the intersection of the amplitude line QF and the vertical line passing through 120 degrees of the phase of the spindle. Thereafter, the position of each change point A is on the amplitude line QF, and on an intermediate angle between the angles of change points B adjoining the change point A. For example, in the case of the reference example 1, the change point A2 is at an intermediate position (where the phase of the spindle is 360 degrees) from 240 degrees, which is the phase of the spindle of the change point B1, to 480 degrees, which is the phase of the spindle of the change point B2, and the change point A3 is at an intermediate position (where the phase of the spindle is 540 degrees) from 480 degrees, which is the phase of the spindle of the change point B2, to 720 degrees, which is the phase of the spindle of the change point B3. As described above, the change point A1 is determined using the amount of feed F, the amplitude feed ratio Q, and the number of vibrations D as parameters (change point setting values). The forward feed setting section 192 sets a straight line passing through the 0 degree of the phase of the spindle and the change point A1 as forward feed movement, and the control section 181 outputs a forward feed command for moving the cutting edge along the forward feed movement.

Figure 6C:
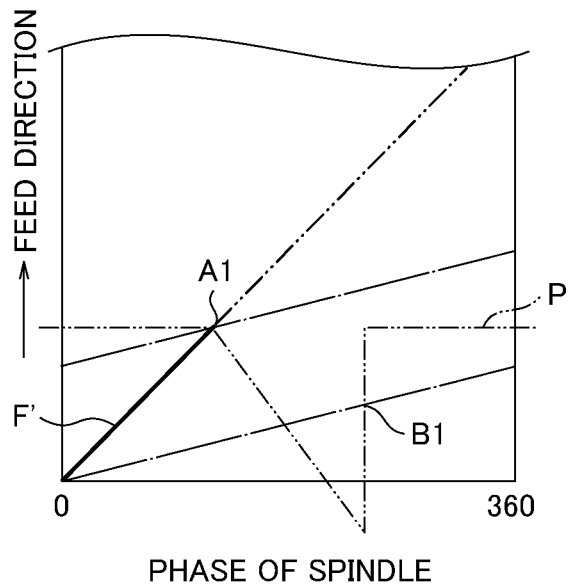
FIG. 6C is a diagram illustrating the generation of the vibration waveform of the reference example 1.

The return movement setting section 193 is configured to output a movement command for moving the cutting tool 130 in the counter-machining direction as a pulse-like signal P at a predetermined interval. As shown in FIG. 6C, the direction change point B1 is at a position where the phase of the spindle is 240 degrees. Therefore, the pulse-like signal P has a downwardly convex waveform (indicated by a two-dot chain line in FIG. 6C) opposite to the feed direction (vertical axis direction in the graph in FIG. 6C) so that the cutting edge returns from the change point A1 to the change point B1. The pulse-like signal P is set as a signal output as a movement command for moving the cutting tool 130 in the counter-machining direction.

Figure 6D:
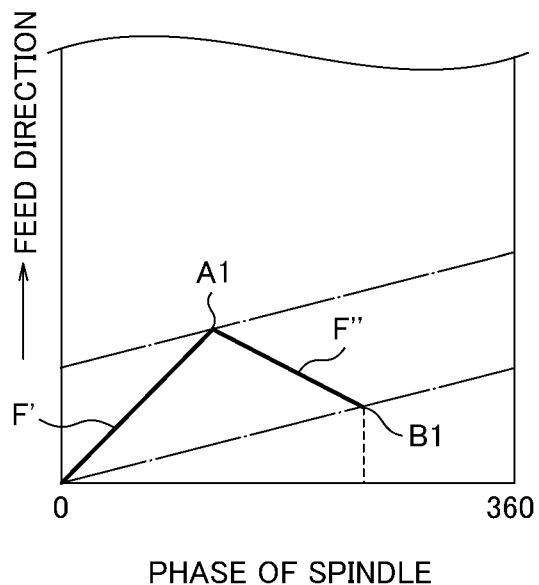
FIG. 6D is a diagram illustrating the generation of the vibration waveform of the reference example 1.

In response to the pulse-like signal P, a return movement, in which the cutting edge periodically moves in the counter-machining direction, is performed. The height of the convex shape of the pulse-like signal P can be determined according to the distance between A1 and B1 viewed in the feed direction. The pulse-like signal P is set so that, by combining the forward feed movement and the return movement, the cutting edge performs a backward movement F''' that connects the change point A1 and the change point B1 as shown in FIG. 6D. And the return movement setting section 193 is configured to include the pulse-like signal P.

The pulse-like signal of the movement command for moving the cutting tool 130 in the counter-machining direction, which is a periodic pulse-like command from the return movement setting section 193, has a period so that the backward movement F''' is started from each change point A. First, at the timing when the phase of the spindle is 120 degrees, the cutting edge starts the backward movement F''' from the change point A1 to the change point B1 (a position where the phase of the spindle is 240 degrees) by the command of moving in the counter-machining direction (the downwardly convex portion of the pulse-like signal).

Figure 7A:
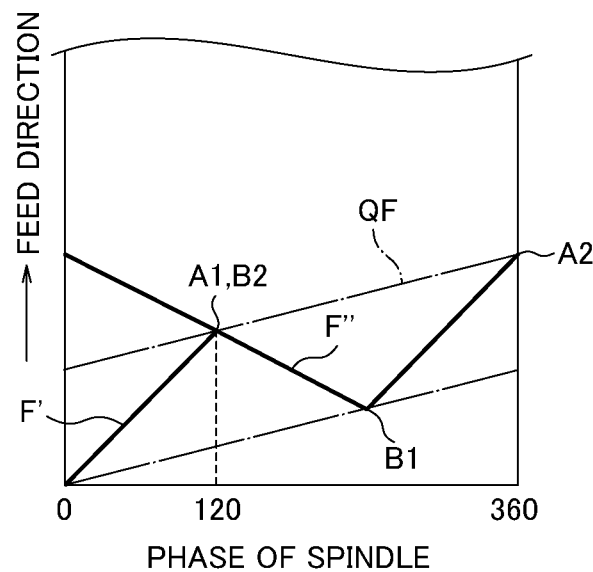
FIG. 7A is a diagram illustrating the generation of the vibration waveform of the reference example 1.

On the other hand, if there is no command of moving in the counter-machining direction from the return movement setting section 193, the cutting edge simply moves from the change point B to the change point A along the forward feed movement. Therefore, as shown in FIG. 7A, a forward movement F' from the change point B1 to the change point A2 (a position where the phase of the spindle is 360 degrees) is performed.

Next, the movement in the counter-machining direction is commanded at the timing when the phase of the spindle is 360 degrees, and a backward movement F''' passing through the change point A2 and the change point B2 (a position where the phase of the spindle is 480 degrees) is performed. When the change point A1 and the change point B2 coincide with each other, the air-cut occurs and the chip is segmented.

Figure 7B:
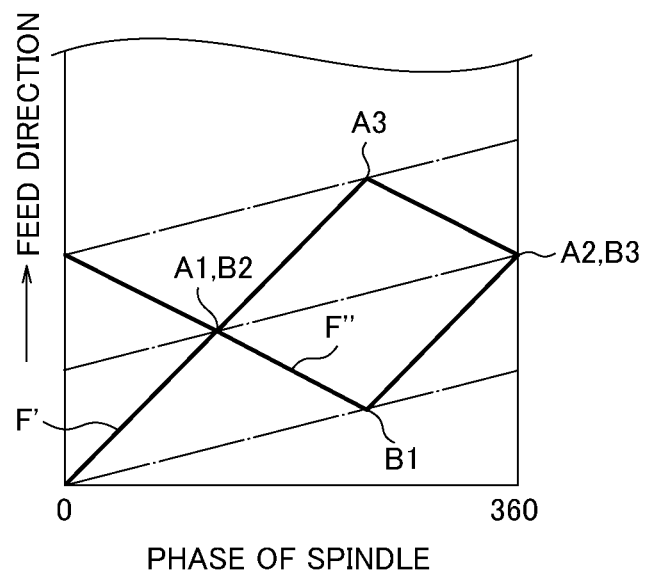
FIG. 7B is a diagram illustrating the generation of the vibration waveform of the reference example 1.

The above operation is repeated, and as shown in FIG. 7B, the forward movement F' passing through the change point B2 and the change point A3 (a position where the phase of the spindle is 540 degrees) and the backward movement F''' passing through the change point A3 and the change point B3 (a position where the phase of the spindle is 720 degrees) are performed. When the change point A2 and the change point B3 coincide with each other, the chip is segmented.

As described above, the cutting tool 130 can be fed with the above-mentioned vibration by combining the forward feed movement and the return movement. In particular, by the return position calculation section 191, the forward feed setting section 192 and the return movement setting section 193, the vibration of the cutting tool 130 can be automatically set according to the predetermined amount of feed F. Thus, it is possible to easily perform cutting with the vibration according to the amount of feed F.

The number of vibrations D can be set to be less than one. FIG. 8 shows an example in which the number of vibrations D is 0.5 (times/r). For performing this cutting, the number of rotations of the spindle and the amount of feed F are also specified in advance for example by specifying them in a machining program.

When the amount of feed F is specified, as shown in FIG. 8, a substantial feed line G is determined (indicated by a dashed line in FIG. 8). The cutting tool 130 reaches the substantial feed line G when one vibration is completed, and the movement thereof switches from backward movement to forward movement.

In the example of the graph shown in FIG. 8, the phase of the spindle 110 is set as the horizontal axis direction and the position in the feed direction of the cutting tool 130 is set as the vertical axis. In the example, the cutting tool 130 vibrates one time while the spindle 110 performs multiple rotation (two rotation in this example). In the movement route of the cutting tool 130, the forward movement and the backward movement are performed at the same speed. The cutting tool 130 advances with forward movement in the first rotation of the spindle 110, the movement thereof switches from forward movement to backward movement at the position of 180 degrees in the last rotation of the multiple rotations of the spindle 110 (in the second rotation of the spindle 110 in this example), and the cutting tool 130 moves backward toward the substantial feed line G. The rotation amount of the spindle during the forward and backward movement of the cutting tool 130 is a rotation amount E of the spindle per vibration of the cutting tool. Further, the rotation amount of the spindle during the backward movement of the cutting tool 130 is a rotation amount R of the spindle in the backward movement of the cutting tool 130. Here, the rotation amount R of the spindle during the backward movement of the cutting tool 130 is, in other words, the rotation amount of the spindle required from the time when the movement of the cutting tool 130 switches from the forward movement to the backward movement to the time when the cutting tool 130 reaches the substantial feed line G, For example in a machining program, as a condition for vibration, the rotation amount of the spindle during the backward movement can be specified by a value following R (argument R), and the rotation amount of the spindle per vibration of the cutting tool can be specified in advance by a value following E (argument E).

The rotation amount E of spindle per vibration of the cutting tool is the inverse number of the number of vibrations D, and is 2.0 (r/times) in the example in FIG. 8. On the basis of the rotation amount E of the spindle and the amount of feed F at the time when one vibration is completed, the return position calculation section 191 calculates a position of the phase of the spindle corresponding to the rotation amount E of the spindle on the substantial feed line G as a return position.

Figure 9A:
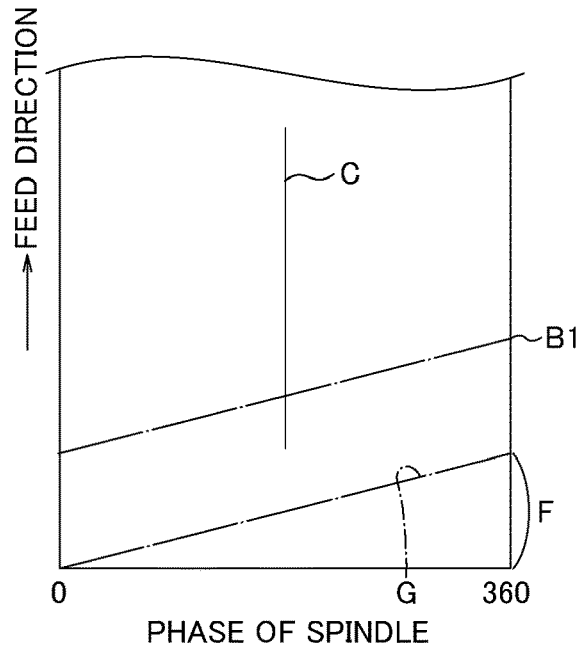
FIG. 9A is a diagram illustrating the generation of the vibration waveform of the reference example 2.
Figure 9B:
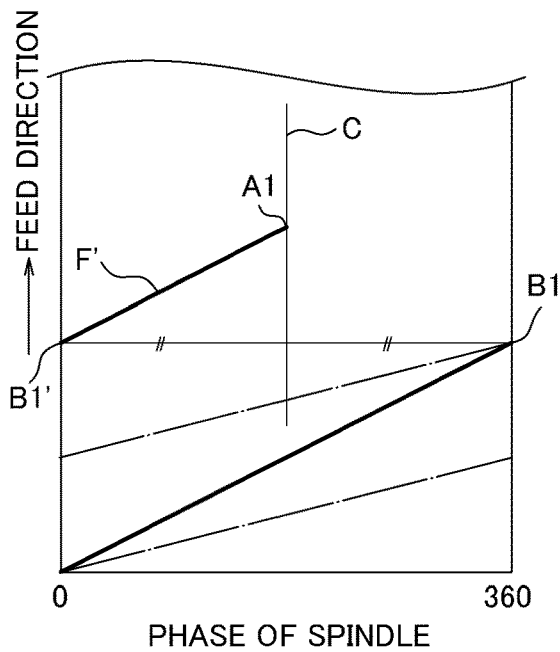
FIG. 9B is a diagram illustrating the generation of the vibration waveform of the reference example 2.

FIG. 8 shows the return positions in two vibrations as direction change points B1 and B2 at which the backward movement changes to the forward movement. The vibration waveform in FIG. 8 is expressed on a workpiece basis, and the return positions of the cutting tool 130 at the time when one vibration is completed are positions of the phase of the spindle on the substantial feed line G (indicated by a dashed chain line in FIG. 9A) obtained by multiplying the angle of one rotation of the spindle (360 degrees) by the rotation amount E of the spindle. As shown in FIG. 9B, in the reference example 2, the change point B1 is at a position where the phase of the spindle is 720 degrees. Thereafter, each change point is a position on the substantial feed line G with an interval of an angle corresponding to two rotations of the workpiece W, and in the case of the reference example 2, the change point B2 on the substantial feed line G is in a position where the phase of the spindle is 1440 degrees. As described above, the return position calculation section 191 can calculate each return position on the bases of the rotation amount E of the spindle and the amount of feed F at the time when one vibration is completed.

In the reference example 2, the rotation amount R of the spindle in the backward movement is 0.5 (rotation), thus a rotation of 180 degrees is required from the start to the end of the backward movement. Therefore, as shown in FIG. 9B, the direction change point A1, at which the forward movement switches to the backward movement, is a phase of the spindle (540 degrees), which is obtained by subtracting the angle corresponding to the rotation amount R of the spindle from the phase of the spindle at the return position (720 degrees).

In the reference example 2, since the forward movement and the backward movement are at the same speed, the forward feed setting section 192 sets a line C of 540 degrees of the phase of the spindle as the axis of symmetry, sets a point that is line symmetrical with respect to the change point B1 as the symmetry point B1', and sets the straight line passing through 0 degree of the phase of the spindle and the symmetry point B1' as the forward feed movement. The control section 181 outputs a forward feed command for moving the cutting edge along the forward feed movement.

As shown in FIG. 9B, the change point A1 is at a position where the phase of the spindle is 540 degrees on a straight line passing through 0 degree of the phase of the spindle and the symmetry point B1'. In other words, the change point A1 is determined using the amount of feed F, the rotation amount R of the spindle in the backward movement and the rotation amount E of the spindle at the time when one vibration is completed as parameters (change point setting values). The forward feed setting section 192 sets the forward movement on the basis of the change point setting values.

Thereafter, each change point A is at each position of the phase of the spindle, which depends on the rotation amount E of the spindle at the time when one vibration is completed. Thus, each symmetry point B' is a point that is line symmetrical with respect to each change point B with the axis of symmetry being the line of the phase of the spindle of each change point A corresponding to each change point B. In the case of the reference example 2, for example, the symmetry point B2' is at a position 360 degrees before 1440 degrees of the phase of the spindle of the change point B2. Thus, the symmetry point B2' is a position where the phase of the spindle is 1080 degrees. And, for example, the change point A2 is at a position 180 degrees before 1440 degrees of the phase of the spindle of the change point B2. Thus, the change point A2 is a position where the phase of the spindle is 1260 degrees.

Figure 9C:
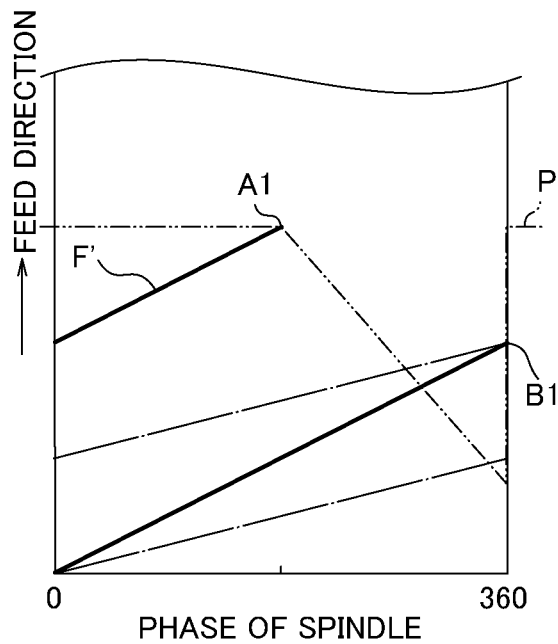
FIG. 9C is a diagram illustrating the generation of the vibration waveform of the reference example 2.

As shown in FIG. 9C, the direction change point B1 is at a position where the phase of the spindle is 720 degrees. The pulse-like signal P is a periodic pulse-shaped command output from the return movement setting section 193 and is a movement command for moving the cutting edge in the counter-machining direction. The pulse-like signal P has a downwardly convex waveform (indicated by a two-dot chain line in FIG. 9C) opposite to the feed direction (vertical axis direction in the graph in FIG. 9C) so that the cutting edge returns from the change point A1 to the change point B1. The pulse-like signal P is set as a signal output as a movement command for moving the cutting edge in the counter-machining direction. The height of the convex shape of the pulse-like signal P can be determined according to the distance between A1 and B1 viewed in the feed direction.

Figure 9D:
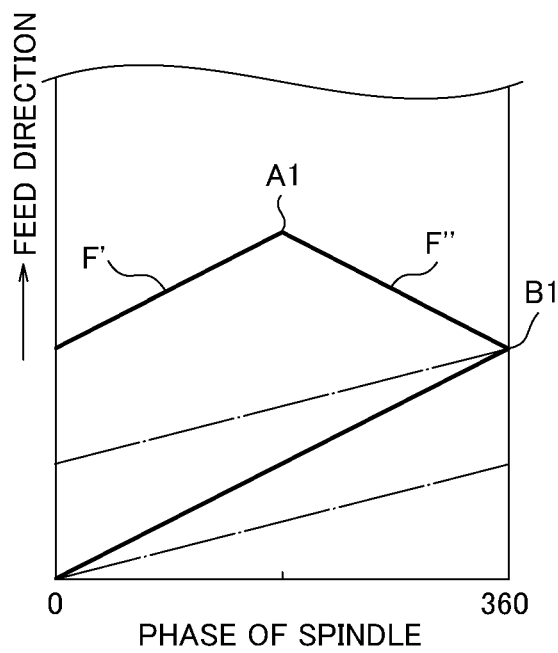
FIG. 9D is a diagram illustrating the generation of the vibration waveform of the reference example 2.

By combining the forward feed movement and the return movement, the pulse-like signal P is set so that the cutting edge performs a backward movement F''' that connects the change point A1 and the change point B1 as shown in FIG. 9D. And the return movement setting section 193 is configured to include the pulse-like signal P.

The pulse-like signal has a period so that the backward movement F''' is started from each change point A. The cutting edge starts the backward movement F''' from the change point A1 to the change point B1 (a position where the phase of the spindle is 720 degrees) at the timing when the phase of the spindle is 540 degrees by the command of moving in the counter-machining direction (the downwardly convex portion of the pulse-like signal). When the backward movement F''' intersects with the forward movement F'' at the change point B1, the chip is segmented.

Figure 10A:
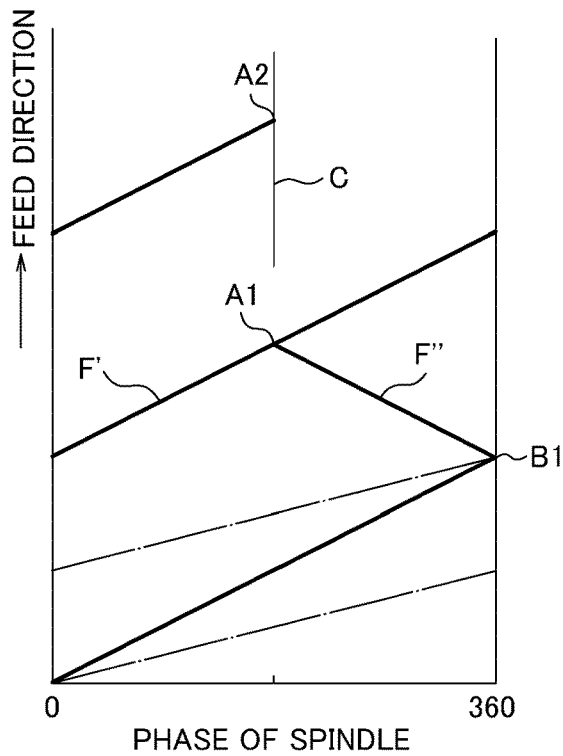
FIG. 10A is a diagram illustrating the generation of the vibration waveform of the reference example 2.

On the other hand, if there is no command of moving in the counter-machining direction from the return movement setting section 193, the cutting edge simply moves from the change point B to the change point A along the forward feed movement. Therefore, as shown in FIG. 10A, a forward movement F' from the change point B1 to the change point A2 (a position where the phase of the spindle is 1260 degrees) is performed.

Figure 10B:
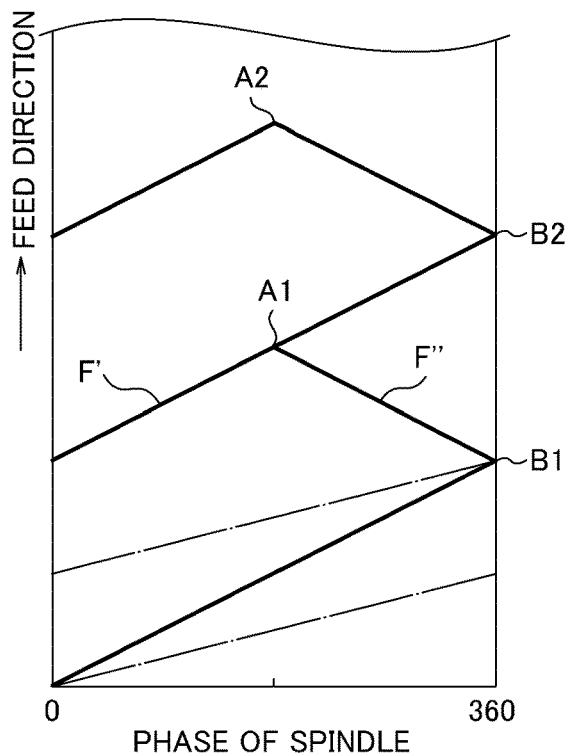
FIG. 10B is a diagram illustrating the generation of the vibration waveform of the reference example 2.

Next, movement in the counter-machining direction is commanded at the timing when the phase of the spindle is 1260 degrees, and as shown in FIG. 10B, a backward movement F''' passing through the change point A2 and the change point B2 (a position where the phase of the spindle is 1440 degrees) is performed. When the backward movement F''' intersects with the forward movement F' at the change point B2, the chip is segmented.

As described above, the cutting tool 130 can be fed with the above-mentioned vibration by combining the forward feed movement and the return movement. In particular, by the return position calculation section 191, the forward feed setting section 192 and the return movement setting section 193, the vibration of the cutting tool 130 can be automatically set according to the predetermined amount of feed F. Thus, it is possible to easily perform cutting with the vibration according to the amount of feed F.

In the reference examples 1 and 2 described above, the spindle 110 is rotated and fed in the Z-axis direction. However, the present invention is not limited to these examples. The same effect also can be obtained, for example in cases where the spindle 110 is rotated and the cutting tool 130 is fed in the Z-axis direction, the cutting tool 130 is rotated and the spindle 110 is fed in the Z-axis direction, the spindle 110 is fixed and the cutting tool 130 is rotated and fed in the Z-axis direction, and the like. The Z-axis direction feeding mechanism corresponds to the feeding means of the present invention. In addition, the rotation amount E of the spindle per vibration of the cutting tool in the reference example 2 may be set not only to an integral number of rotations such as two rotations and three rotations, but also to a number corresponding to a rotation angle exceeding one rotation (360 degrees).

The pulse-like signal P of the return movement setting section 193 may be a signal or the like that repeats a command for moving the cutting tool 130 to the phase of the spindle of the change point A in the machining direction and a command for moving the cutting tool 130 from the phase of the spindle of the change point A in the counter-machining direction. In this case, the forward feed setting section 192 can set the forward feed movement so that the forward feed movement is a combination of a movement of the cutting edge in the machining direction based on the pulse-like signal P (the movement in the machining direction by the command for moving the cutting tool to the phase of the spindle of the change point A in the machining direction) and a movement in the machining direction by a predetermined forward feed command. The predetermined forward feed command can be, for example, a forward feed command for moving the cutting edge onto the substantial feed line G.

Figure 11A:
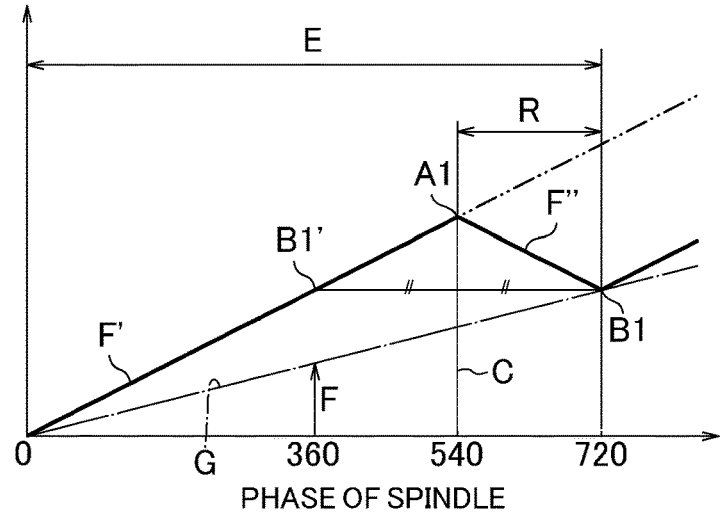
FIG. 11A is a diagram illustrating the vibration waveform of the reference example 3.

Particularly, FIG. 11A shows an example where the number of vibrations D is 0.5 (times/r). When the amount of feed F is specified, a substantial feed line G (indicated by a dashed line in the figure, which corresponds to the feed line of the cutting tool of the present invention) is determined. Further, on the basis of the rotation amount E of the spindle per vibration of the cutting tool and the amount of feed F, the return position (change point B1) on the substantial feed line G is calculated.

In a case where the rotation amount R of the spindle in the backward movement of the cutting tool 130 is 0.5 (rotation), the direction change point A1 at which the forward movement switches to the backward movement is at 540 degrees of the phase of the spindle. The line C of 540 degrees of the phase of the spindle is set as the axis of symmetry, and a symmetrical point B1', which is line symmetrical with respect to the change point B1, is set. Then, the straight line passing through 0 degree of the phase of the spindle and the symmetrical point BP is set as forward feed movement.

Figure 11B:
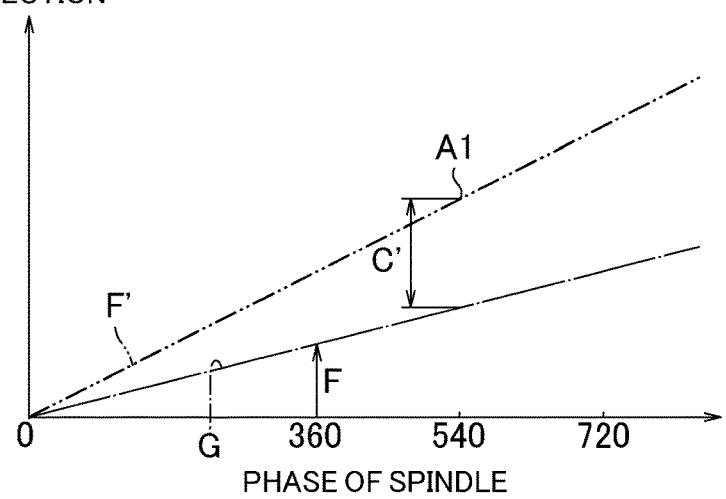
FIG. 11B is a diagram illustrating the vibration waveform of the reference example 3.
Figure 11C:
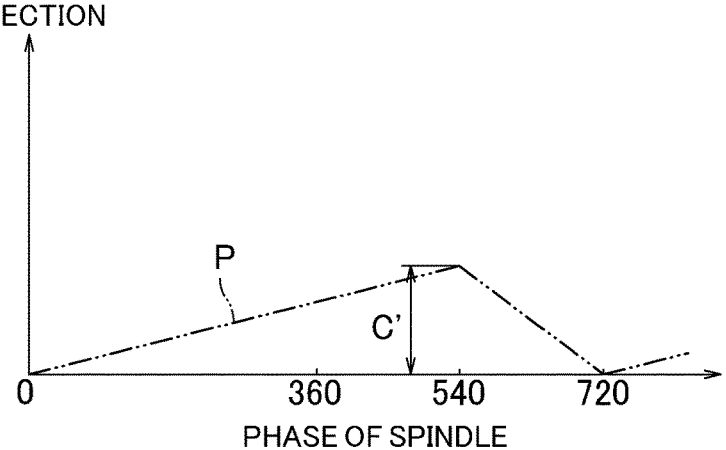
FIG. 11C is a diagram illustrating the vibration waveform of the reference example 3.

If the predetermined forward feed command is a forward feed command for moving the cutting edge onto the substantial feed line G, there is a positional difference C' between the substantial feed line G and the change point A1 at a position where the phase of the spindle is 540 degrees as shown in FIG. 11B. The pulse-like signal P is set to have an upwardly convex waveform (indicated by a two-dot chain line in FIG. 11C) which is forwardly directed in the feed direction (vertical axis direction of the graph in FIG. 11B) so as to return the cutting edge to the substantial feed line G after obtaining the positional difference C'.

The forward feed setting section 192 sets the forward feed movement (indicated by F') by combining the movement in the machining direction by a command of the pulse-like signal P, which is for moving the cutting edge in the machining direction to 540 degrees of the phase of the spindle at the change point A1, and the movement in the machining direction determined by the amount of feed F (substantial feed line G).

The pulse-like signal P has a period so that a straight line passing through 0 degree of the phase of the spindle and the symmetry point B1' starts from 0 degree of the phase of the spindle. The cutting edge starts the forward movement F' from 0 degree of the phase of the spindle to the change point A1 at the timing when the phase of the spindle is 0 degree, and starts the backward movement F''' from the change point A1 on the forward movement F' at the timing when the phase of the spindle is 540 degrees. Thereafter, the command for moving the cutting edge in the machining direction from the phase of the spindle of the change point B to the phase of the spindle of the change point A and the command for moving the cutting edge in the counter-machining direction from the phase of the spindle of the change point A to the phase of the spindle of the change point B are repeated by the pulse-like signal P.

The movement in the machining direction by the command of the pulse-like signal P for moving the cutting edge in the machining direction and the movement in the machining direction by the forward feed command can be arbitrary movements as long as they are combined to be the forward feed movement. The substantial feed line G is same as a line determined by the amount of feed F in general cutting without above-mentioned vibration (that is conventional cutting). Therefore, by setting the forward feed command as a forward feed command for moving the cutting edge onto the substantial feed line G, the forward movement F' can be obtained by adding the pulse-like signal P to the conventional cutting.

In the reference example 3, an example where the change point A1 is determined from the amount of feed F, the rotation amount R of the spindle in the backward movement, and the rotation amount E of the spindle at the time when one vibration is completed is described. However, the pulse-like signal P can also be naturally applied to a case where the change point A1 is determined from the amount of feed F, the amplitude feed ratio Q, and the number of vibrations D.

Present Example

Further, the pulse-like signal P of the return movement setting section 193 may be formed in sine waveform.

Figure 12A:
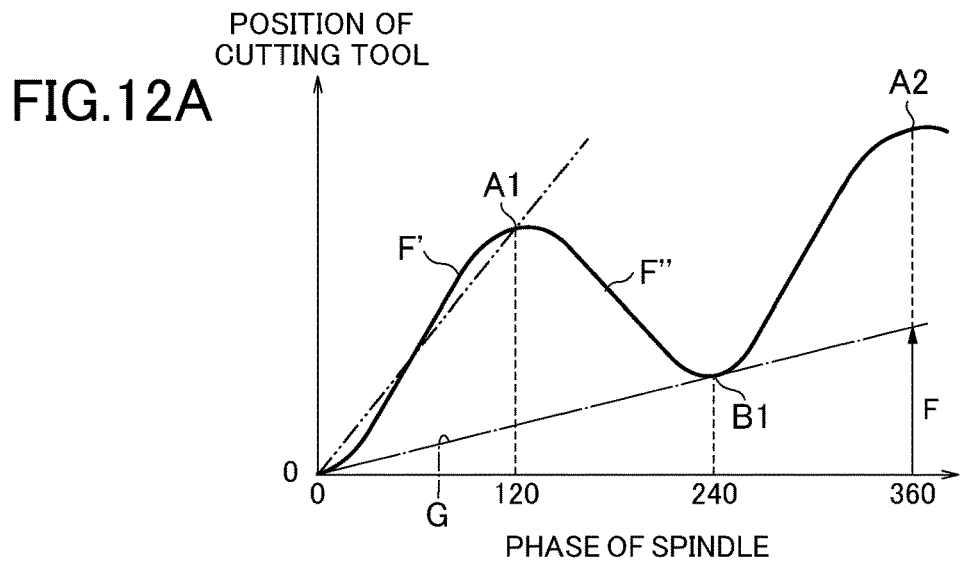
FIG. 12A is a diagram illustrating the vibration waveform of the present example.

Particularly, FIG. 12A shows an example where the number of vibrations D is 1.5 (times/r). When the amount of feed F is specified, a substantial feed line G (indicated by a dashed line in the figure, which corresponds to the feed line of the cutting tool of the present invention) is determined. Further, in a case where the number of vibrations D is 1.5 (times/r), the return position (change point B1) on the substantial feed line G is a position where the phase of the spindle is 240 degrees, and the direction change point A1 at which the forward movement switches to the backward movement is at 120 degrees of the phase of the spindle.

Figure 12B:
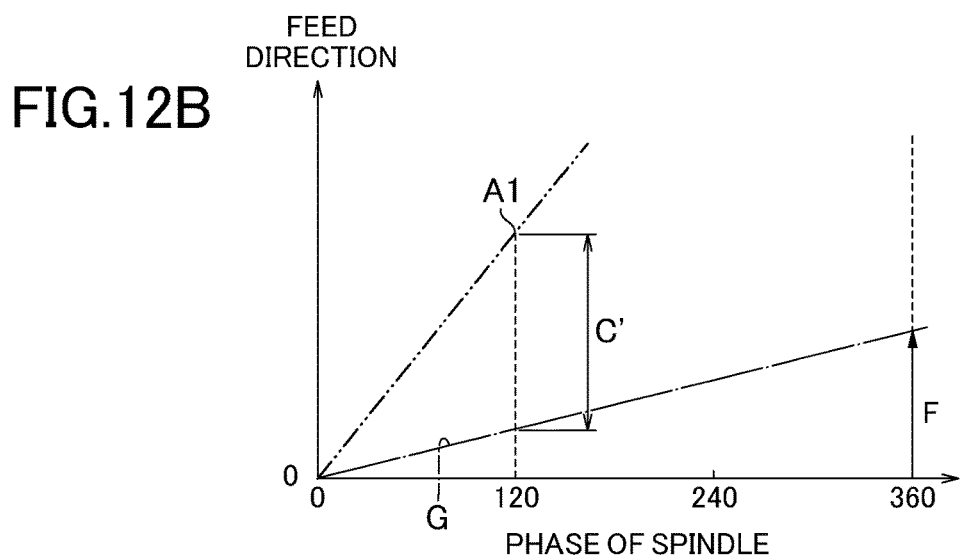
FIG. 12B is a diagram illustrating the vibration waveform of the present example.

Similar to the reference example 3, if the predetermined forward feed command is a forward feed command for moving the cutting edge onto the substantial feed line G, there is a positional difference C' between the substantial feed line G and the change point A1 at a position where the phase of the spindle is 120 degrees as shown in FIG. 12B. The pulse-like signal P is set to have a sign waveform (indicated by a two-dot chain line in FIG. 12C) so as to return the cutting edge to the substantial feed line G after obtaining the positional difference C'.

Figure 12C:
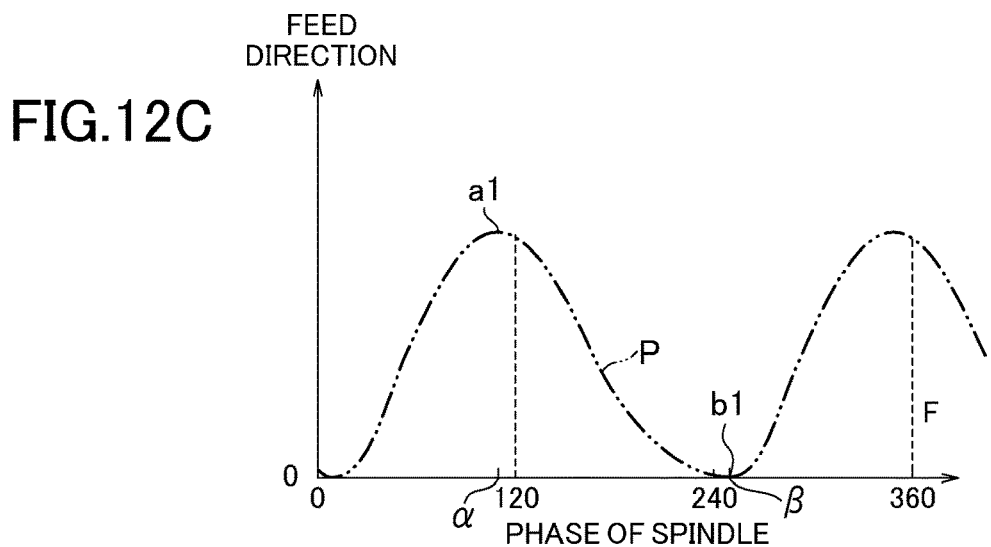
FIG. 12C is a diagram illustrating the vibration waveform of the present example.

In the present example, the substantial feed line G and a curve of sine waveform are combined. The α degrees of the phase of the spindle at the inflection point a1 (the point at which the sine curve changes from convex to concave (the point at which the curvature of the curve changes from positive to negative)) shown in FIG. 12C is set to a value different from 120 degrees of the phase of the spindle of the change point A1 (for example, a value smaller than 120 degrees) shown in FIG. 12A. In this way, the cutting edge reaches the top of the convex shape on the sine curve at the change point A1 (at 120 degrees of the phase of the spindle) and then heads toward the bottom of the concave shape. Further, the β degrees of the phase of the spindle at the inflection point b1 (the point at which the sine curve changes from concave to convex (the point at which the curvature of the curve changes from negative to positive)) shown in FIG. 12C is set to a value different from 240 degrees of the phase of the spindle of the change point B1 (for example, a value larger than 120 degrees) shown in FIG. 12A. In this way, the cutting edge reaches the bottom of the concave shape on the sine curve at the change point B1 (at 240 degrees of the phase of the spindle) and then heads toward the top of the convex shape.

The forward feed setting section 192 sets the forward feed movement (indicated by F' in FIG. 12) by combining the movement in the machining direction by a command, which is for moving the cutting edge in the machining direction to 120 degrees of the phase of the spindle at the change point A1 of this sine waveform, and the movement in the machining direction determined by the amount of feed F (substantial feed line G).

The pulse-like signal P has a period so that the concave shape of this sine waveform starts from a position which is (β-240) degrees later than the 0 degree of the phase of the spindle. At the timing when the phase of the spindle is 0 degree, the cutting edge starts the forward movement F' (the movement in the right part of the concave shape (movement in the left part of the convex shape)) from 0 degree of the phase of the spindle to the change point A1, and starts the backward movement F'' from the change point A1 on the forward movement F' at the timing when the phase of the spindle is 120 degrees. This F'' reaches the bottom of the concave shape on the sine curve at the 240 degrees of the phase of the spindle at the change point B1. Thereafter, the command for moving the cutting edge in the machining direction from the phase of the spindle of the change point B to the phase of the spindle of the change point A and the command for moving the cutting edge in the counter-machining direction from the phase of the spindle of the change point A to the phase of the spindle of the change point B are repeated by the pulse-like signal P.

REFERENCE SIGNS LIST 100 machine tool
110 spindle
110A spindle headstock
120 chuck
130 cutting tool
130A tool post
150 X-axis direction feeding mechanism
151 base
152 X-axis direction guide rail
153 X-axis direction feeding table
155 linear servomotor
155a mover
155b stator
160 Z-axis direction feeding mechanism
161 base
162 Z-axis direction guide rail
163 Z-axis direction feeding table
165 linear servomotor
165a mover
165b stator
180 control device
181 control section
182 numerical value setting section
183 storage section
190 motor control section
191 return position calculation section
192 forward feed setting section
193 return movement setting section

The invention claimed is:

1. A controller for a machine tool having a feeder relatively moving a cutting tool and a material, and having a motor relatively rotating at least one of the cutting tool and the material with respect one another,
   the controller configured to:
      control an operation of the feeder and the motor while vibrating the cutting tool relative to the material by combining a forward feed movement in a machining direction, in which the cutting tool machines the material, and a return movement in a counter-machining direction different from the machining direction,
   wherein the controller is further configured to:
      calculate a return position of the cutting tool at a time when one vibration is completed using a number of vibrations and an amount of feed that are predetermined for one rotation of the cutting tool or the material as parameters; and
      output a pulse signal that includes a command for moving the cutting tool to a change point from the machining direction to the counter-machining direction, and a command for moving the cutting tool from the change point to the return position in the counter-machining direction, and
   wherein the pulse signal is formed in a sine waveform with an inflection point, and a phase of the inflection point for making the cutting tool reach the change point is set to a value different from a phase of the change point.

2. The controller according to claim 1, wherein the number of vibrations is one or more.

3. The controller according to claim 1, wherein the number of vibrations is less than one.

4. A machine tool comprising the controller according to claim 1.

5. A machine tool comprising the controller according to claim 2.

6. A machine tool comprising the controller according to claim 3.

* * * * *